(12) United States Patent
Copus

(10) Patent No.: US 7,125,082 B2
(45) Date of Patent: Oct. 24, 2006

(54) AUXILIARY MULTIPURPOSE LOADING AND UNLOADING APPARATUS FOR TRUCKS AND THE LIKE

(76) Inventor: Gary D. Copus, 12062 Mead Rd., Middletown, CA (US) 95461

( * ) Notice: Subject to any disclaimer, the term of this patent is extended or adjusted under 35 U.S.C. 154(b) by 61 days.

(21) Appl. No.: 10/862,968

(22) Filed: Jun. 7, 2004

(65) Prior Publication Data
US 2005/0031438 A1 Feb. 10, 2005

Related U.S. Application Data
(60) Provisional application No. 60/467,362, filed on Jun. 5, 2003.

(51) Int. Cl.
B60P 1/04 (2006.01)
(52) U.S. Cl. ...................................... 298/1 A
(58) Field of Classification Search ............... 298/1 A, 298/12, 17 R, 19 V, 17 B; 296/183.2
See application file for complete search history.

(56) References Cited

U.S. PATENT DOCUMENTS

| | | | | |
|---|---|---|---|---|
| 86,979 A | * | 2/1869 | Gary ........................... | 298/12 |
| 1,678,569 A | * | 7/1928 | Janssen ........................ | 298/12 |
| 2,195,995 A | * | 4/1940 | Pabian ......................... | 298/12 |
| 2,529,558 A | * | 11/1950 | Klingebiel ................... | 298/14 |
| 2,534,156 A | * | 12/1950 | Wyatt et al. ................. | 414/500 |
| 2,852,303 A | * | 9/1958 | Hopson .................... | 296/26.09 |
| 3,450,437 A | * | 6/1969 | McQueen ..................... | 298/14 |
| 3,471,045 A | * | 10/1969 | Panciocco ................... | 414/522 |
| 3,915,496 A | | 10/1975 | Mabry, Jr. | |
| 4,681,371 A | | 7/1987 | Leonard | |
| 5,267,779 A | | 12/1993 | Talamantez | |
| 5,636,902 A | * | 6/1997 | Norbury ....................... | 298/12 |
| 6,077,024 A | * | 6/2000 | Trueblood .................. | 414/462 |
| 6,196,634 B1 | | 3/2001 | Jurinek | |
| 6,371,564 B1 | | 4/2002 | Yates | |

FOREIGN PATENT DOCUMENTS

EP 22720 * 1/1981 .................. 298/12

* cited by examiner

Primary Examiner—H Gutman
(74) Attorney, Agent, or Firm—Craig M. Stainbrook; Stainbrook & Stainbrook, LLP (57) ABSTRACT

A multipurpose loading and unloading apparatus for installation on a pickup truck bed or the floor of a vehicle cargo area. The inventive apparatus includes a load-bearing member, such as a cargo box, having at least a slide board panel with an upper load-bearing side and a lower roller-engaging side. A roller mount is disposed under the slide board panel and includes, at a minimum, opposing and parallel guide rails. A roller assembly is interposed between the slide board panel and the roller mount, and it is tethered to the roller platform at a pivot point forward from the center of gravity of the load-bearing member. As the load-bearing member is moved rearwardly, it reaches a point at which it is tilted naturally when unloaded, and with little effort when loaded.

8 Claims, 12 Drawing Sheets

AUXILIARY MULTIPURPOSE LOADING AND UNLOADING APPARATUS FOR TRUCKS AND THE LIKE

CROSS REFERENCE TO RELATED APPLICATIONS

The present application claims the benefit of the filing date of U.S. Provisional Patent Application, Ser. No. 60/467,362, filed Jun. 5, 2003.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to pickup truck accessories, and more particularly to an auxiliary loading and unloading apparatus suitable for use with pickup trucks, sports utility vehicles, station wagons, vans, trailers, and flatbed trucks.

BACKGROUND INFORMATION AND DISCUSSION OF RELATED ART

Because pickup trucks, vans, station wagons, SUVs, and the like, are generally sold with fixed beds, conversion units are known in the art. Such conversion units, or auxiliary apparatus, is employed to provide means for the user to dump debris or to more easily load and unload articles. Generally, dumper auxiliary units are actuated by some power means, most frequently hydraulic pistons. Such units are expensive to install, largely incorporated into the structure of the truck bed and therefore substantially fixed and permanent, prone to breakage and expensive to maintain, and slow in operation. Notably, because of their fixed installation, they tend to reduce the flexibility in vehicle uses and all but eliminate the owner's motivation to swap accessories according to need or predilection, e.g., to change the dumper for a camper shell.

Illustrative and exemplary known prior art devices include the dumper shown in U.S. Pat. No. 6,371,564 to Yates et al, which teaches a system for dumping material from a dump box in a pickup truck where the dump box first rolls slightly to the rear so as to clear a bumper or other structure on the rear of the vehicle. Then the dump box lifts via hydraulic side mounted pistons.

U.S. Pat. No. 6,196,634 B1, to Jurinek, discloses a movable bed liner hinged at the back end for converting a pickup truck into a dump truck. A pair of linear hydraulic rams disposed in respective compartments in front of the wheel wells is operable to raise and lower the dump body liner. The invention purportedly uses otherwise unusable, "dead" space in front of the wheel wells and preserves the appearance of a normal flatbed pickup truck.

U.S. Pat. No. 5,267,779, to Talamantez, Jr. et al, teaches a pickup truck conversion dumping body having two separate assemblies; one comprising an open cargo box configured to accommodate pickup truck cargo bed; and a companion assembly comprising a track system with a movable carriage which may be maneuvered back and forth with a chain drive. The two assemblies are attached to one another with the cargo box body riding upon the carriage and attached to the carriage with connecting links. The carriage is arranged into the track system with casters so that it can ride in a horizontal position under normal operation. An escape pattern is provided with the track system, which allows the cargo box to be easily tilted. When the carriage has traveled a predetermined distance, the cargo box is then tilted downward by the force of gravity, causing its contents to be dumped. When the cargo box body is not needed for dumping purposes it may be disconnected from carriage.

U.S. Pat. No. 4,681,371, to Leonard, discloses a dumper comprising a framework, a tiltable bin, a pair of latches, rollers, a pair of hooks, a rod, and a pair of handles. The framework comprises a pair of longitudinal tracks with one long arm located orthogonally to and coplanarly with the longitudinal tracks; and two shorter arms and, parallel to the long arm. The long arm is mounted at the rear end of the truck bed, while the two shorter arms are mounted at the middle and front end of the tracks, respectively. The framework is removably secured to the truck bed. The tiltable bin is slidingly mounted on the framework. The bin pivots through the use of two hooks and a hook stop or rod. The hooks are mounted on the underside of the bin, in the inner space between the two parallel tracks, and are equally spaced to the tracks. The hooks are located near the center of gravity of the bin and toward the front end of the bin. The hook stop or rod is mounted at the rear end of the longitudinal tracks and spans between the tracks.

U.S. Pat. No. 3,915,496, to Mabry Jr., shows a dumping device comprising a unit adapted for placement in a pickup truck. The unit includes a cargo box that moves longitudinally along a set of rollers and a jack for tilting the box.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The limitations in the prior art are addressed and surmounted by the characteristics and features of the present invention, wherein an auxiliary dumping unit for pickup trucks, vans, SUVs, station wagons, trailers, flat bed trucks, and the like, is provided which is inexpensive to manufacture, easy to operate, generally free of mechanical parts prone to breakage or failure, requires minimal maintenance, eliminates the need of power means, and may be easily installed and removed and therefore lends itself to rapid changeover with other vehicle accessories. The present invention achieves these advantages by providing a versatile auxiliary dumping apparatus adapted for installation vehicles of the above-indicated type (which may be summarily referenced by use of the term "pickup truck(s)." The system may be employed to provide a dumping bed, a loading/unloading platform, or a readily deployable portable worktable that doubles to carry materiel, tools, supplies, and the like. The inventive apparatus comprises, most essentially, a set of rollers arrayed in the bed of the truck and, preferably, a set of rollers arrayed about the lower surface of a bed, platform, or table, each of the latter functioning as a load-bearing member having an upper surface adapted for bearing a load. The roller arrays cooperate to provide means to roll the load-bearing member outwardly from the rear of the truck bed. The load-bearing member is attached to the truck bed with a tether or trip cord attached forward of the center of gravity of the load-bearing member and in such a fashion that when deployed a predetermined amount, and if desired by the user, the tether member will catch the load bearing member and tilt it backwardly and downwardly to dump articles on its upper surface.

It is therefore an object of the present invention to provide a new and improved auxiliary dumping apparatus that is lightweight and easily installed in a truck, SUV, or the like.

It is another object of the present invention to provide a new and improved auxiliary loading and unloading apparatus that comprises few structural and functional components.

A further object or feature of the present invention is a new and improved auxiliary loading and unloading apparatus that is inexpensive to manufacture and that will, therefore, be inexpensive to the consumer.

An even further object of the present invention is to provide a novel is to provide an auxiliary loading and unloading apparatus that includes a roller assembly that can be segregated from the loading and unloading apparatus to provide a standalone loading and unloading device.

Still another object of the present invention is to provide an auxiliary loading and unloading apparatus that includes a roller assembly that moves as a unit as the load-bearing cargo box moves upon it.

Yet another object of the present invention is to provide a loading and unloading apparatus that is operated entirely manually with ease and without any mechanical assistance.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DRAWING REFERENCE NUMERALS

Figure 7:
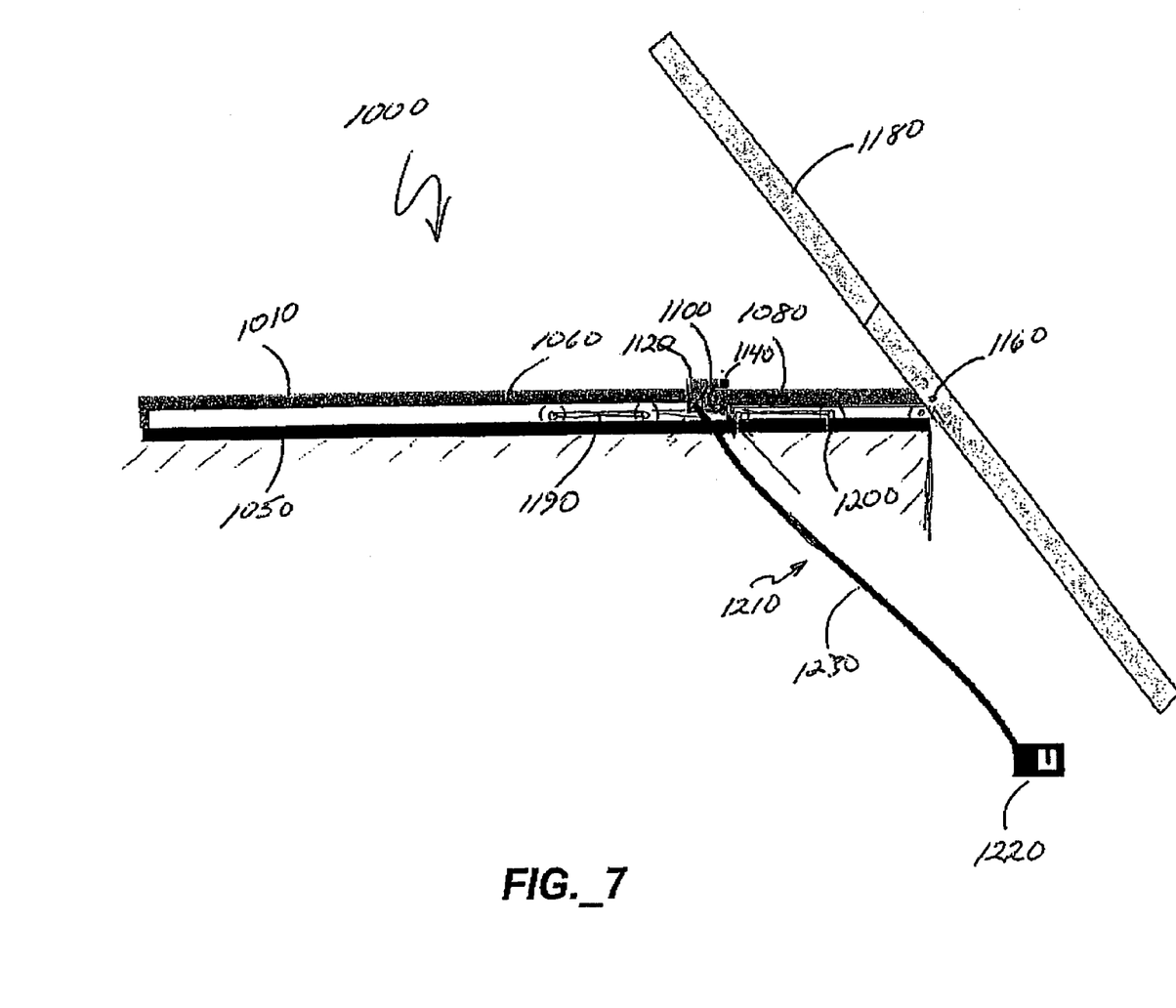
FIG. 7 is a schematic side view in elevation showing a third preferred embodiment of the inventive apparatus.
Figure 8:
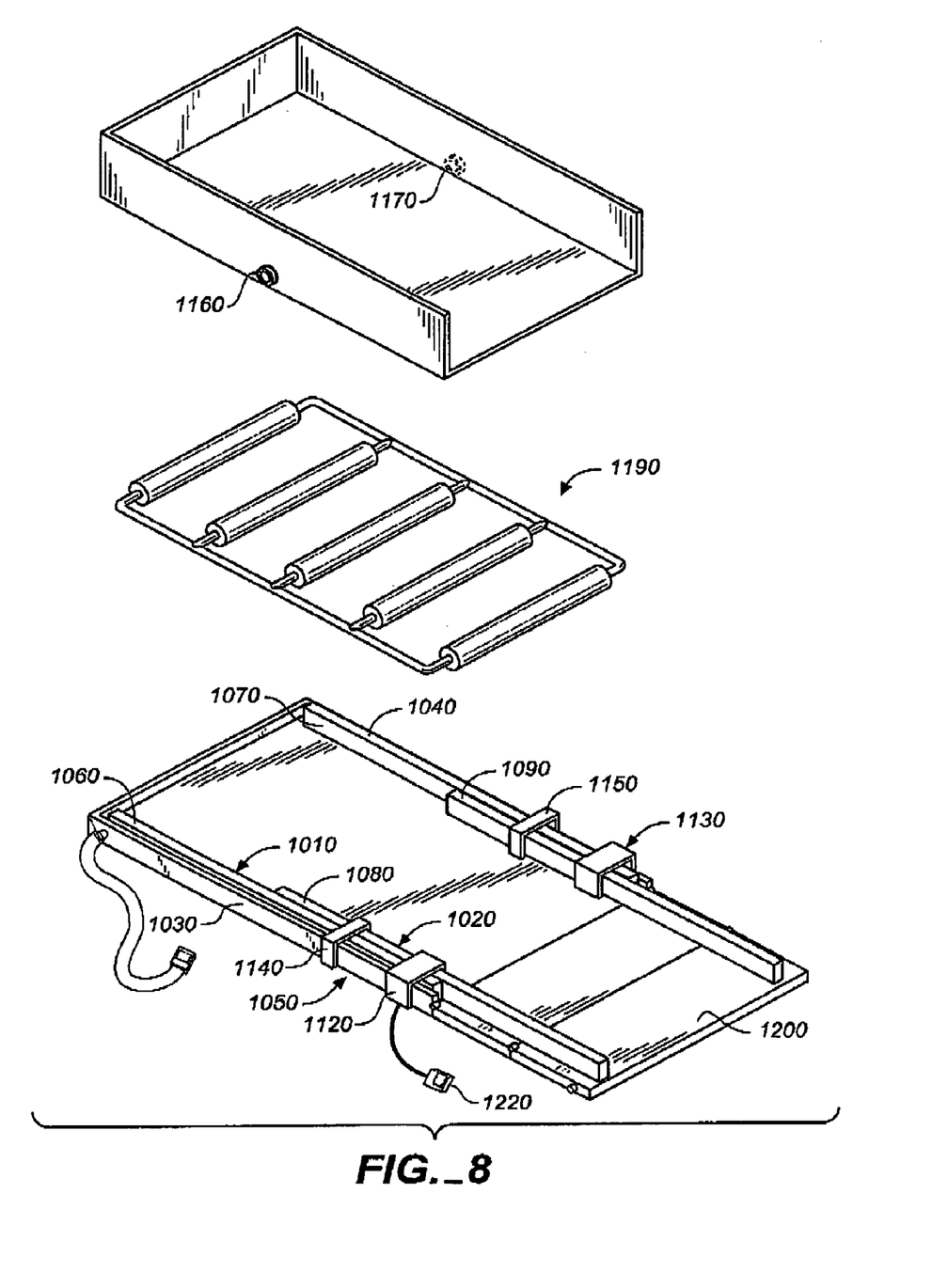
FIG. 8 is a perspective view showing elements of the apparatus of FIG. 7.

FIGS. 1–3D
100 first preferred embodiment of the invention
110 cargo box
120 slide board panel
130 load-bearing side of slide board panel
140 lower, roller-engaging side of slide board panel
150 front panel
160 front portion of cargo box
170 open rear end of cargo box
190a,b right and left side panels
200 roller mount
210 front portion of roller mount
220 rear portion of roller mount
230 guide rail
240 guide rail
250 first tether
260 second tether
270 first roller mount tether connection point
280 second roller mount tether connection point
290 first cargo box tether connection (pivot) point
300 second cargo box pivot tether connection (pivot) point
310 roller platform
320 upper surface of roller platform
330 lower surface of roller platform
340 front transverse rail
360 tail gate
370 roller platform rear end
380 first hinged panel
390 first hinge
400 second hinged panel
410 second hinge
420 latch
430 locking lever
440 vehicle attachment means (for affixing the roller mount to a vehicle)
450 seat belt straps
460 seat belt buckles
470 seat belt clip
500 roller assembly
510 frame
520 side rail
530 side rail
540 transverse rails
550 rollers
600 alternative roller assembly design
610 first roller grid
620 second roller grid FIGS. 4–6C
700 second preferred embodiment of invention
710 cargo box
720 roller assembly
730 underside of cargo box
740 first cable
750 second cable
760a front bracket
760b back bracket
770a front bracket
770b back bracket
780 roller frame
790 first longitudinal tube
800 second longitudinal tube
810 transverse member
820 rollers
830 front roller
840 first front roller bracket
850 second front roller bracket
860 latching handle
870 bracket
880 front panel of roller platform
890 roller platform
900 tethers
910 tether connection points
920 cargo box tether connection points
930 lower portion of cargo box
940 tension springs FIGS. 7–8
1000 third preferred embodiment of inventive apparatus
1010 first slide rail assembly
1020 second slide rail assembly
1030 side rail of roller mount
1040 side rail of roller mount
1050 roller mount
1060 slide portion
1070 slide portion
1080 bridge arm
1090 bridge arm
1100 slide block
1110 slide block
1120 braking block
1130 braking block
1140 adjustment block
1150 adjustment block
1160 connecting pin
1170 connecting pin
1180 load-bearing member
1190 roller assembly
1200 tailgate portion of roller mount
1210 brake assembly
1220 manual brake
1230 brake cable

DETAILED DESCRIPTION OF THE INVENTION

Referring firstly to FIGS. 1A through 3D, and next to FIGS. 4 through 6C, wherein like reference numerals refer to like components in the various views, there is illustrated therein a new and improved auxiliary multipurpose loading and unloading apparatus for trucks and the like, the first preferred embodiment of which is generally denominated 100 herein, and the second preferred embodiment of which is generally denominated 700 herein.

FIGS. 1A through 3D illustrate a first preferred embodiment 100 of the inventive auxiliary multipurpose loading and unloading apparatus for trucks and the like. These views show, collectively, that in a first preferred embodiment the auxiliary multipurpose loading and unloading apparatus of the present invention comprises, first, a load-bearing cargo member, such as a cargo box or dump box 110, adapted for installation in a conventional pickup truck bed, or an SUV or station wagon cargo area. The shape of the cargo box is substantially rectangular and it is sized to provide a generally close fit within the dimensions of the truck bed, though sizing can be tailored to the intended uses of the vehicle. The cargo box includes a slide board panel 120 having an upper load-bearing side 130, a lower roller-engaging side 140, a front panel 150 installed at the front portion 160 of the cargo box, an open rear end 170, and right and left side panels, 190a, 190b. In its most essential aspect, however, the cargo member may comprise nothing more than the slide board panel with no front panel or side panels.

Next, the inventive apparatus includes a roller mount 200 disposed underneath the slide board panel and also sized and otherwise adapted for installation in the bed of the truck or other vehicle. The roller mount has a front portion 210, and a rear portion 220, and includes, at a minimum, opposing and parallel longitudinally disposed guide rails 230, 240, first and second tethers 250, 260 connected at first and second roller mount tether connection points 270, 280 disposed in the rear portion of the side of the guide rails, and to second cargo box tether connection points, or pivot points, 290, 300, at the side of the cargo box or slide panel and slightly forward of the center of gravity of the cargo box or slide panel. The tether may comprise chain, cable, rope, or any suitably strong and flexible tether means. If the roller mount comprises guide rails only, the rails will be selectively installed in the truck or vehicle cargo area with fastener means, such as bolts, screws, or the like.

Preferably, the roller mount further includes a roller platform 310 to which the side rails are affixed. The roller platform includes an upper surface 320 upon which a roller assembly (described below) is disposed, and a lower surface 330 for placement on the surface of the truck bed or vehicle cargo area. Additionally, and preferably, the roller mount includes a front transverse rail 340 at the roller mount front portion 210 and a hinged tail gate 360 connected to the roller platform rear end 370. The tail gate includes at least a first hinged panel 380 connected to the roller platform with a hinge 390, and it is sized to cover the open rear end 160 of the cargo box 110. A second hinged panel 400 may be connected to the first hinged panel with a second hinge 410 so as to provide a partial cap for the upper portion of the open rear end of the cargo box. The tailgate may is preferably secured with a latch 420. The cargo box may further be provided with spring-biased locking lever 430 at the front portion of the cargo box to secure the box until it is desired that it be rolled backwards.

The front portion of the roller mount may be provide with vehicle attachment means 440, for affixing the roller mount to the vehicle. When the inventive apparatus is adapted for use with station wagons or SUVs, in which the cargo area is proximate either the back seat or an optional cargo area seat, the attachment means preferably comprises seat belt straps 450 and buckles 460 and/or clips 470 that releasably connect to companion seat belt clips and buckles in the seat belt system permanently installed in the vehicle.

Interposed between the roller-engaging side 140 of the slide board panel 120 and the upper surface 320 of the roller platform is a roller assembly, a first design of which 500 (FIG. 2) comprises a substantially rectangular frame 510 having two long side rails 520, 530, and a plurality of cylindrical transverse rails 540 disposed between and connecting the side rails. Axially disposed on at least two of the side rails are rollers 550. In an alternative design 600 (FIG. 2A), the roller assembly includes first and second side-by-side roller grids 610, 620, either spaced apart and discrete, or spaced apart and selectively connected with attachment means 630. In construction, the side-by-side rollers are identical to the above-described first design, but are narrowed for independent use in smaller vehicles.

The roller assembly is lightweight and fabrication may be extremely simple. For instance, both roller assembly designs can be fabricated from PVC pipes of varying diameters: The long rails and transverse rails may comprise PVC pipe of a first diameter, all of which are joined by PVC connectors and fittings, such as T connectors, slip T connectors, and 90 degree elbows, all of which is well known in the art; the rollers may comprise nothing more than PVC pipe of a diameter greater than the first diameter. Accordingly, rather than being journaled at their ends in fixed rails, the rollers are adapted to simultaneously engage both the lower roller-engaging side 140 of the slide board panel 120 and the upper surface 320 of the roller platform 310. This gives rise to a novel feature of the present invention, which resides in the fact that the roller assembly in the first preferred embodiment is permitted to roll rearwardly as the slide board panel 120 of the cargo box 110 is deployed rearwardly for dumping or unloading; and it rolls forwardly as the slide board panel is pushed forwardly into the stored configuration. This is most clearly shown in FIGS. 3A through 3D. In consequence, the rollers bear the entire weight of a load unless and until the cargo box is deployed from the end of the vehicle, at which time gravity will act on the rear portion of the cargo box to unweight the front portion.

It will be appreciated that as the roller assembly moves back and forth, the guide rails of the roller mount constrain and restrict lateral movement of the roller assembly. The front transverse rail 340 provides a forward stop for the roller assembly.

In use, the roller mount 200 is placed onto a truck bed or into a vehicle cargo area, and it is secured as desired. If dumping operations are to be performed, safety dictates that it be securely connected to the vehicle. When it is desired to dump or unload load placed in the cargo box, the tailgate is lowered and brought into substantially planar relationship to the roller platform and truck bed; if the box is locked with locking means, the lock is released and the cargo bed is rolled rearward over the tailgate. The tether is allowed to pay out until the box reaches the tilting point, at which point the tether restricts further backward motion and the natural balance of the box (when unloaded) allows it to tilt for dumping. When loaded primarily forward of the center of gravity, only minimal effort is required to tilt the box for dumping.

Figure 1A:
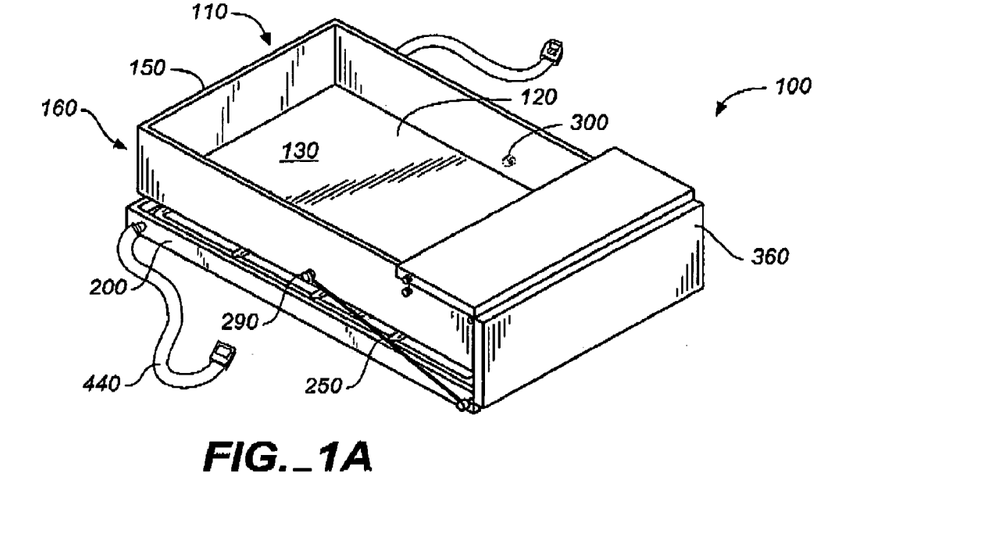
FIG. 1A is an upper perspective view showing a first preferred embodiment of the inventive auxiliary multipurpose loading and unloading apparatus of the present invention in the stored configuration.
Figure 1B:
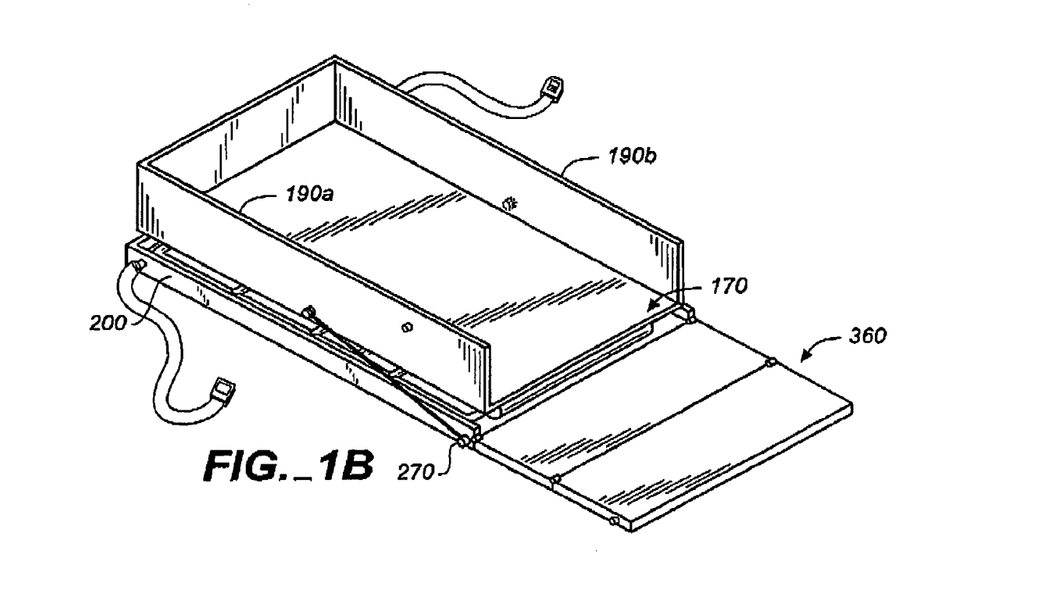
FIG. 1B is a perspective view showing the apparatus of FIG. 1A with the hinged tailgate down.
Figure 1C:
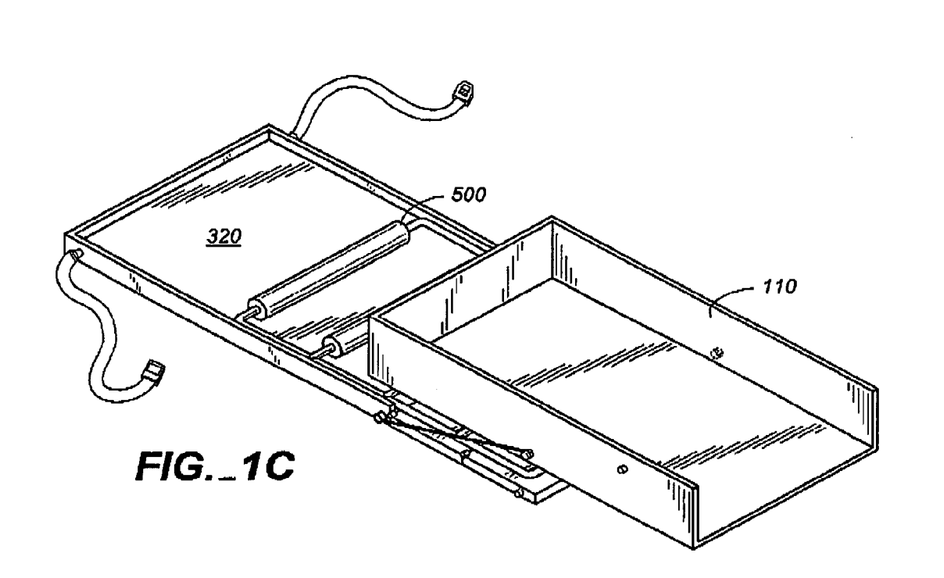
FIG. 1C is a perspective view showing the apparatus partly deployed.
Figure 1D:
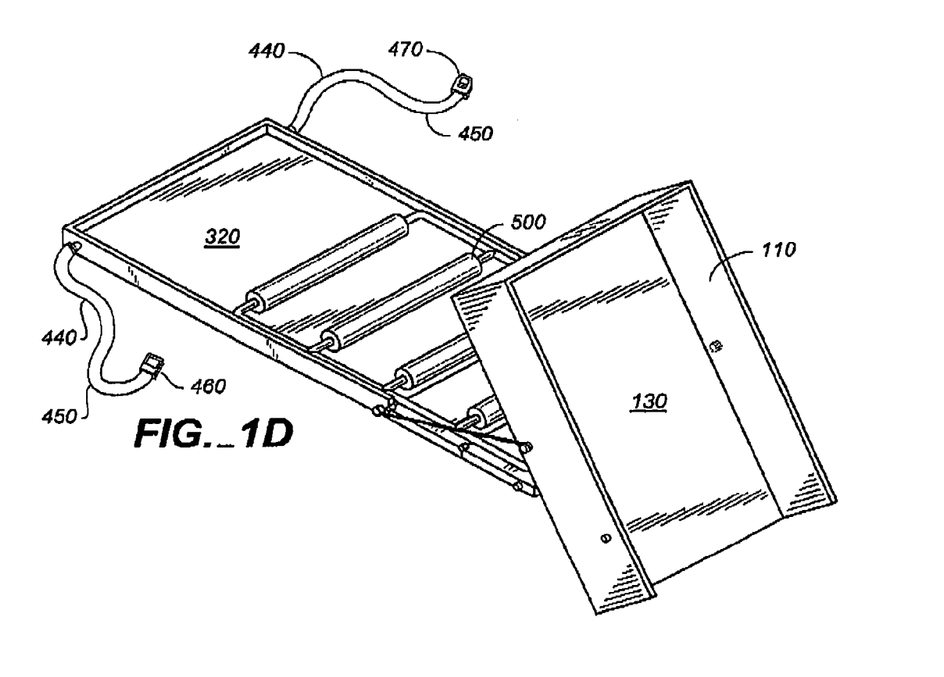
FIG. 1D is a perspective view showing the apparatus fully deployed and with the cargo box tilted for dumping.
Figure 2:
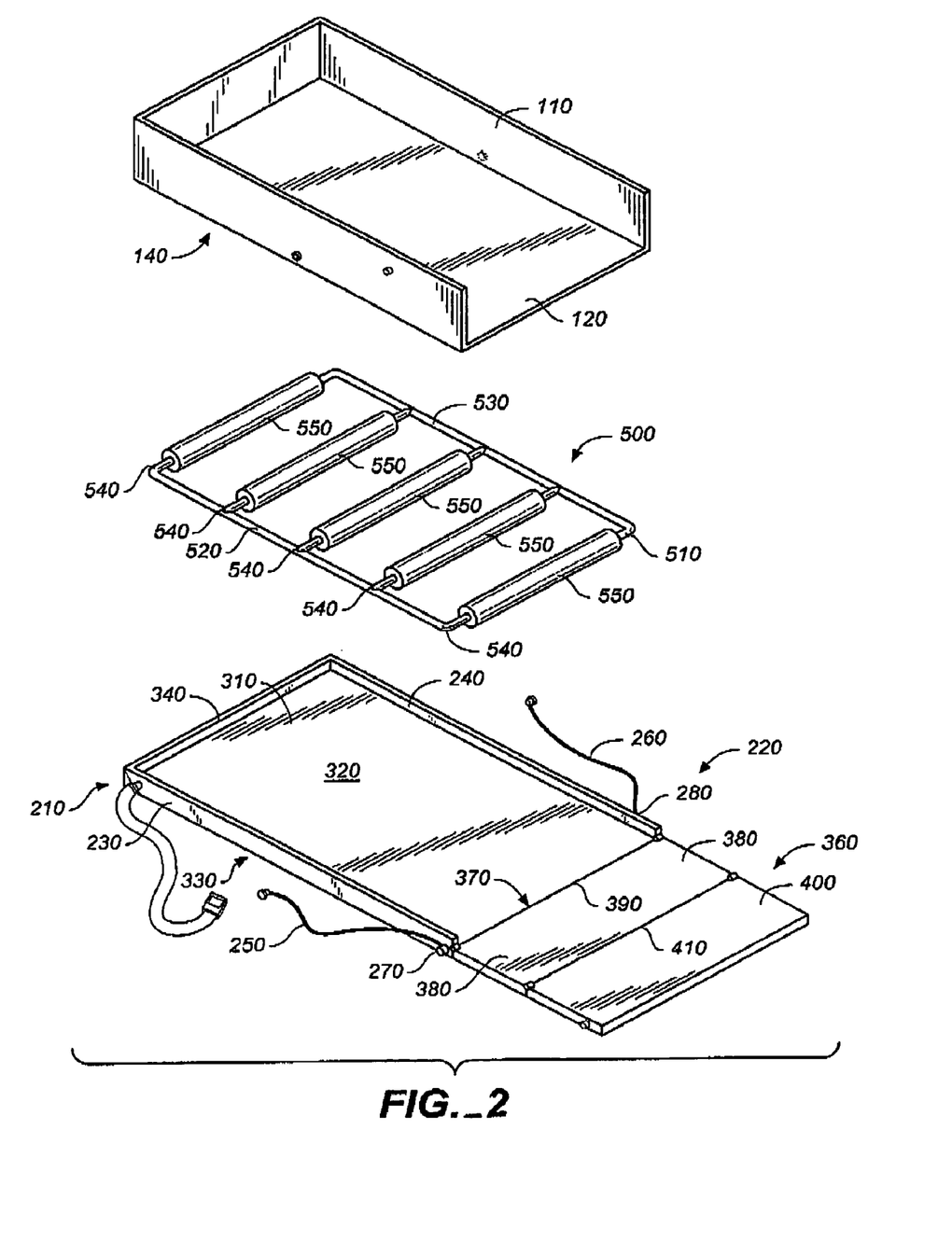
FIG. 2 is an exploded perspective view of the apparatus of FIGS. 1A–D.
Figure 2A:
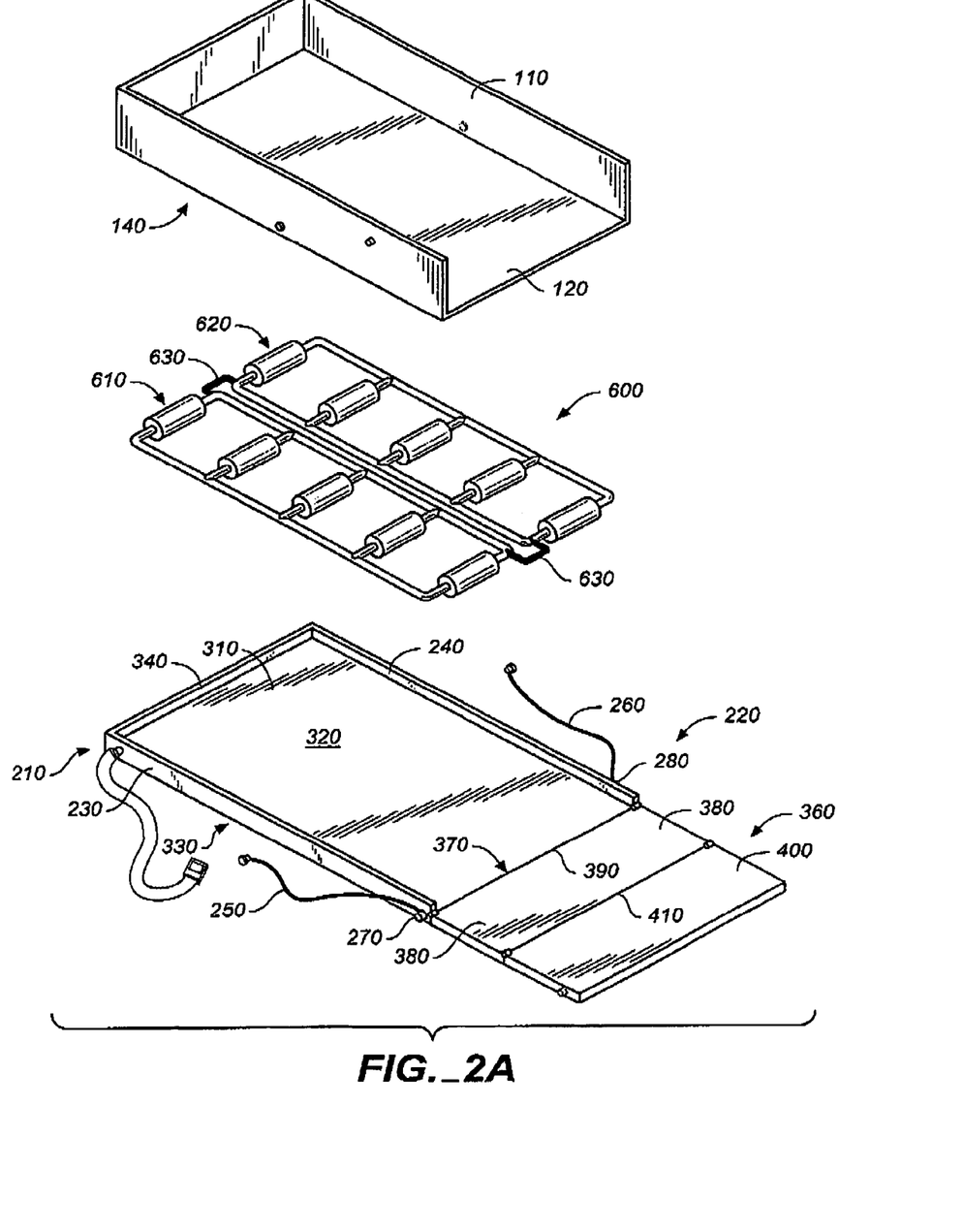
FIG. 2A is an exploded perspective view of the apparatus of FIGS. 1A–D, and showing an alternative roller assembly.
Figure 3A:
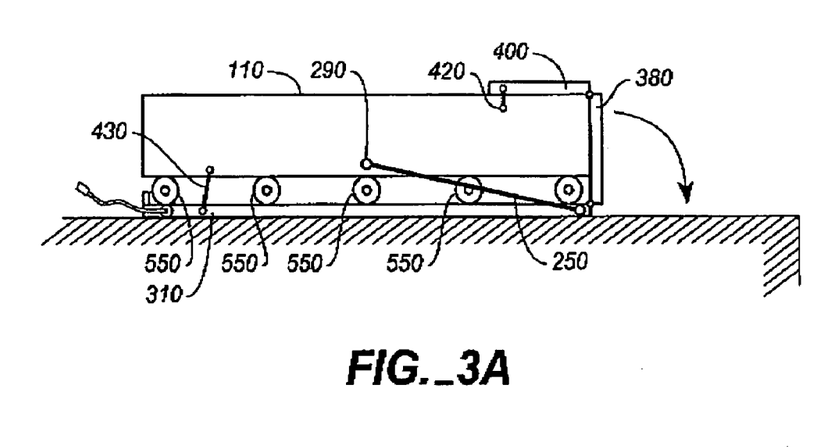
FIG. 3A is a schematic cross-sectional side view in elevation of the first preferred embodiment (the side rail of the frame support is removed to aid in visualizing roller movement)
Figure 3B:
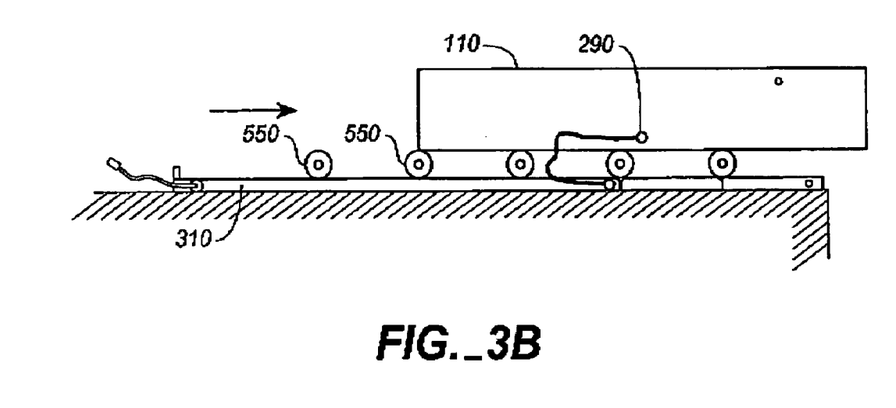
FIG. 3B is a schematic cross-sectional side view in elevation showing the tailgate down and the cargo box partly deployed.
Figure 3C:
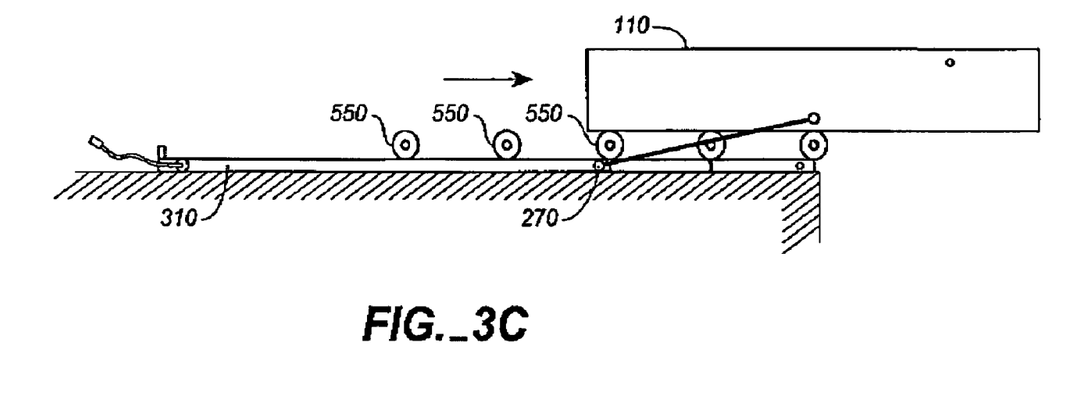
FIG. 3C is a schematic cross-sectional side view in elevation showing the cargo box fully deployed before tilting.
Figure 3D:
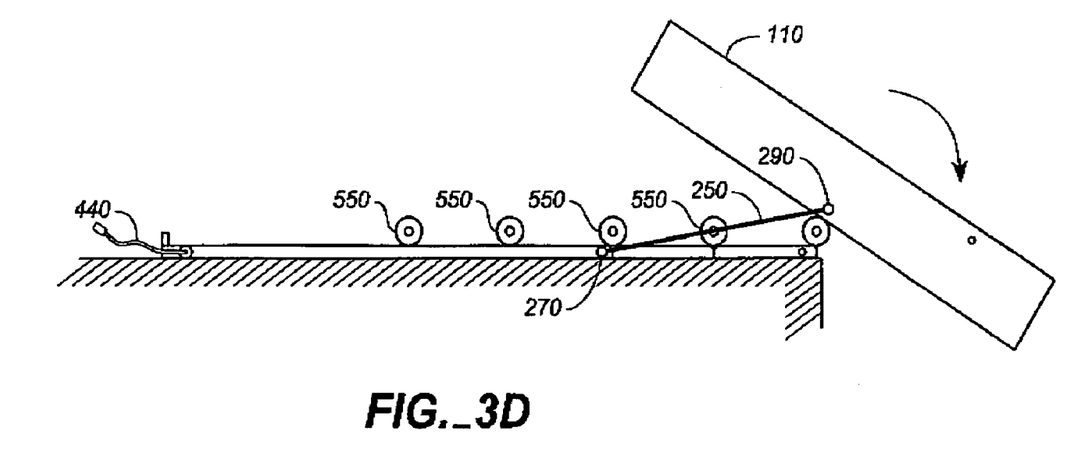
FIG. 3D is a schematic cross-sectional side view in elevation showing the cargo box fully deployed and tilted for dumping.
Figure 4A:
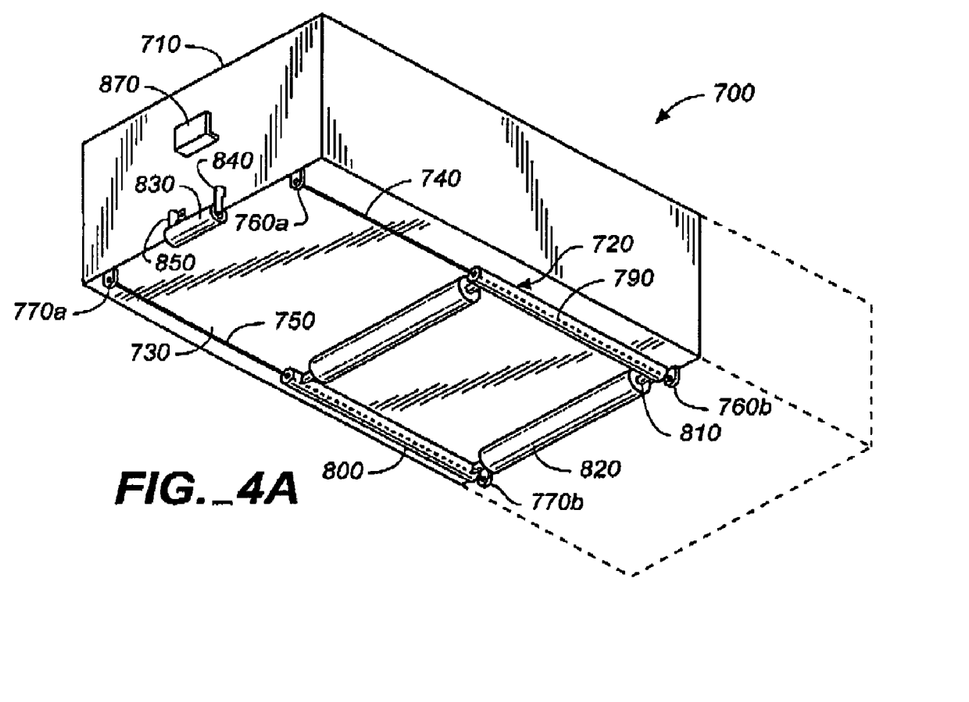
FIG. 4A is a lower perspective view of a second preferred embodiment of the auxiliary multipurpose loading and unloading apparatus of the present invention, showing the apparatus in the stored configuration.
Figure 4B:
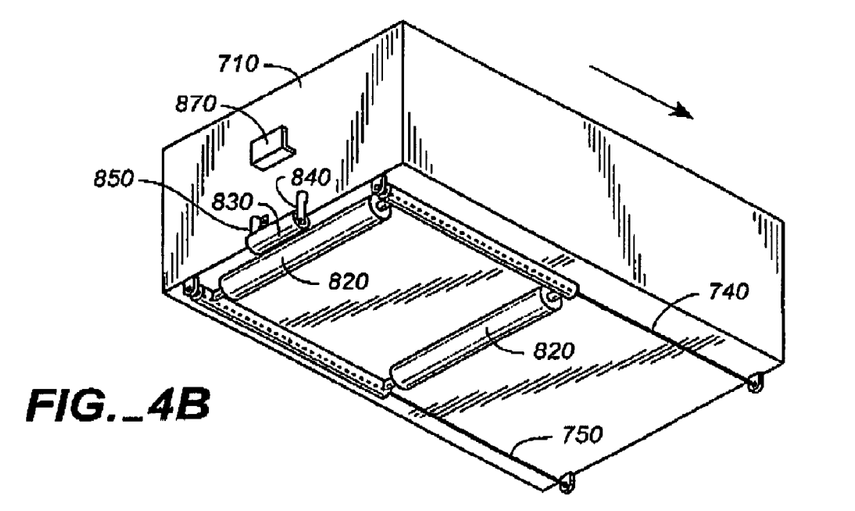
FIG. 4B is a lower perspective view of the apparatus of FIG. 4A shown fully deployed before tilting.
Figure 4C:
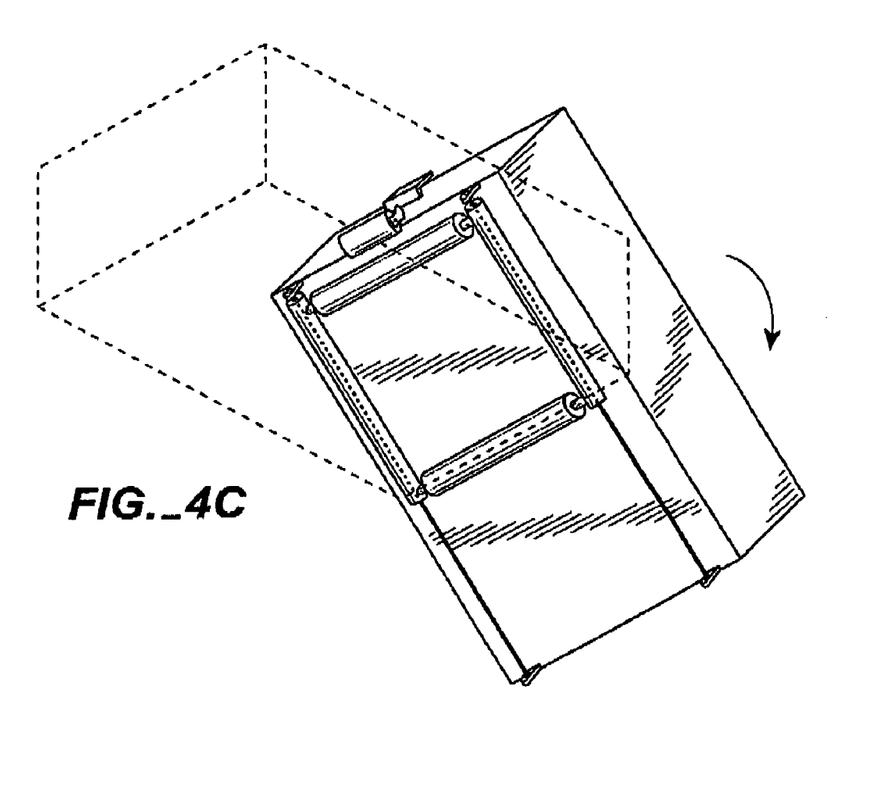
FIG. 4C is a lower perspective view of the apparatus of FIGS. 4A and 4B shown deployed and tilted.
Figure 5:
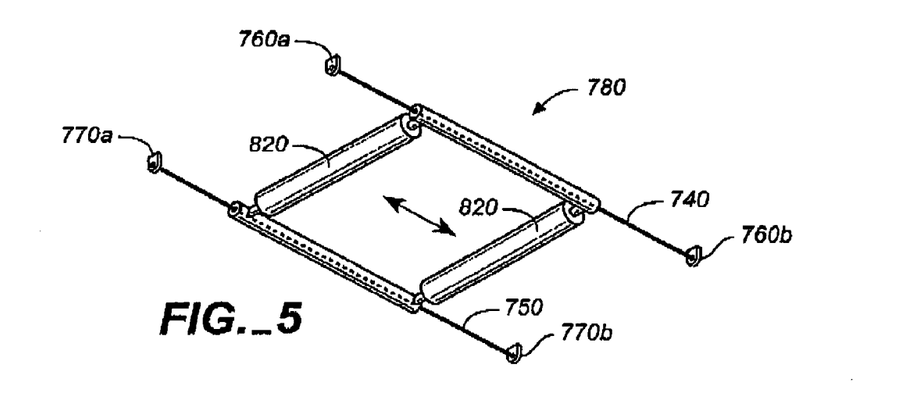
FIG. 5 is a perspective view of the roller assembly portion of the second preferred embodiment.
Figure 6A:
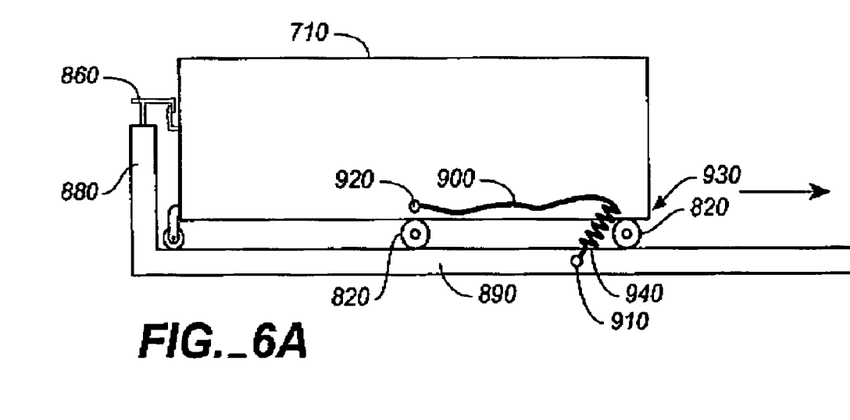
FIG. 6A is a side view in elevation showing the second preferred embodiment installed on a flat bed surface and in the stored configuration.
Figure 6B:
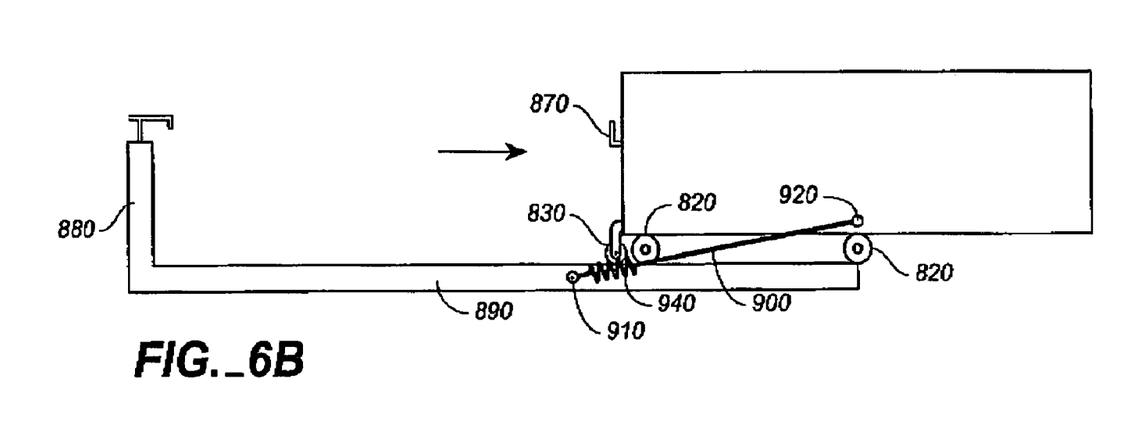
FIG. 6B is a side view in elevation of the apparatus of FIG. 6A showing the apparatus fully deployed before tilting.
Figure 6C:
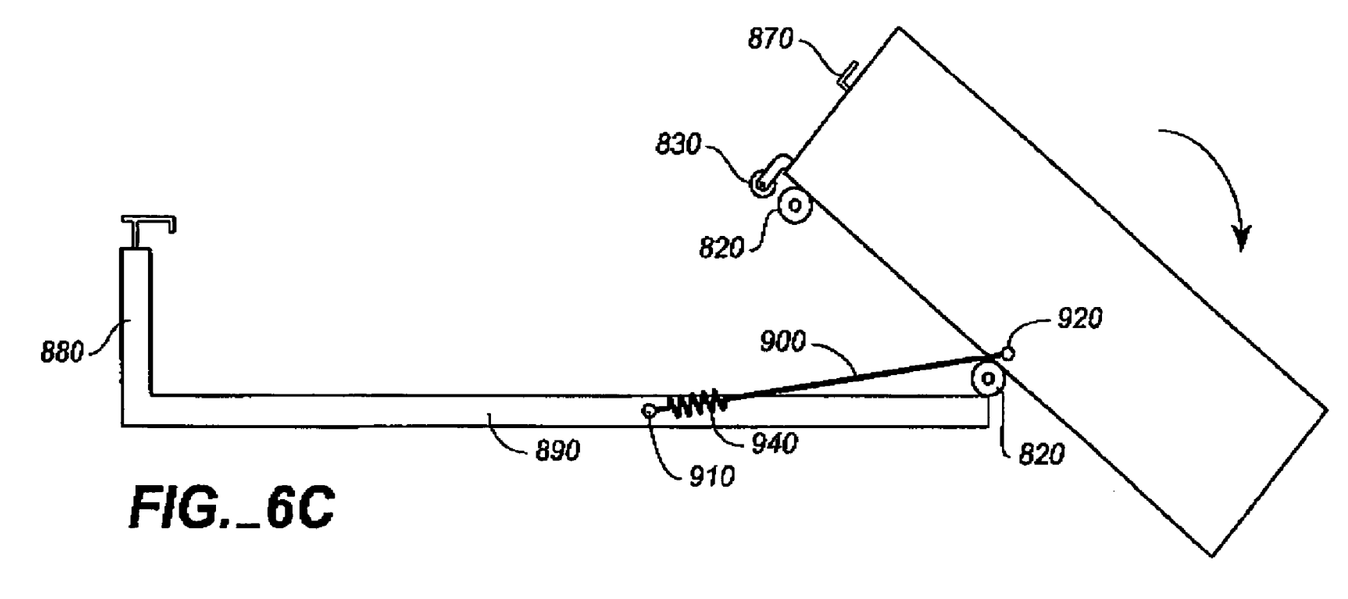
FIG. 6C is a side view in elevation showing the apparatus of FIGS. 6A and 6B fully deployed and tilted for dumping.

As noted, FIGS. 2 and 2A show alternative embodiments of the stand-alone roller assembly 500, 600. These views show the functional essence of the present invention; namely, an apparatus that can be interposed between a load-bearing platform and a truck bed so that the load on the load-bearing platform can slide easily forward and back in the truck bed. However, it will be appreciated that unlike the above-described combinations, the roller assemblies may be separated from the inventive apparatus and employed separately for independent use in bearing and moving loads. This eliminates the need for any kind of permanent installation of rollers or supports to obtain the functional benefits of the present invention.

As will be appreciated in viewing FIGS. 2 and 2A, the roller grid assembly may be is entirely separable from the other elements of the inventive combination and yet provides a rolling surface for a platform or a cargo box so that the load-bearing side of the platform or box is effectively equipped with means to slide within the bed of a truck. This eliminates the need for any kind of permanent installation of rollers or supports to obtain the functional benefits of the present invention. Furthermore, the roller assembly may be entirely removed from the inventive combination to provide a standalone roller platform for other applications, such as loading boxes of groceries in the back of an SUV or station wagon.

FIGS. 4 through 6C illustrate a second preferred embodiment 700 of the loading and unloading apparatus of the present invention. In this embodiment, the apparatus comprises a cargo box 710, much as described above. However, rather than including an independent roller assembly, a roller assembly 720 is affixed to the roller-engaging side, or underside 730, of the cargo box. The preferred structure comprises first and second rods or cables 740, 750 extending longitudinally between front and back brackets 760a, 760b, 770a, 770b, on which is slidably mounted a roller frame 780 having first and second longitudinal tubes 790, 800 disposed axially over the first and second rods, respectively, and at least two cylindrical transverse members 810, on each of which is an axially mounted free spinning roller 820.

The cargo box preferably includes a front roller 830 mounted at the front end of the cargo box, preferably journaled between bearings on first and second opposing front roller brackets 840, 850. Locking means, preferably comprising a spring-biased latching handle 860 engaging a bracket 870, provide a mechanism for preventing unwanted rearward movement of the cargo box while in transit while parked on an slope. The locking mechanism may be mounted on a front panel 880 of a roller platform 890 or it may be installed at the front portion of a truck bed, proximate the rear of the cab.

As with the first preferred embodiment, the inventive apparatus is provided with first and second tethers 900, connected at connection points 910 on the roller platform, or on guide rails if no roller platform is provided. Likewise, the tethers are connected to the sides of the cargo box at connection points 920, which are proximate the lower portion 930 of the cargo box slightly forward of the center of gravity of the cargo box. Preferably, the tethers include helical tension springs 940 interposed between the connection points so that the cargo box does not jolt the vehicle as it reaches the end of the tether length during an excursion rearwardly from the truck bed.

The mechanism of operation is identical to that of the first preferred embodiment, except that the roller assembly does not move entirely independently of the cargo box. Instead, it moves longitudinally in a ratio defined by the size of the rollers and remains in general engagement with the underside of the cargo box.

FIGS. 7 and 8 show a third preferred embodiment 1000 of the inventive apparatus, showing that first and second slide rail assemblies 1010, 1020 may be installed immediately inside the side rails 1030, 1040 of the roller mount 1050. The slide rail assemblies each include a slide portion 1060, 1070, a bridge arm 1080, 1090 slidingly installed on the slide portion and which slides lengthwise along the slide portion via a slide block 1100, 1110, each of which includes an integrally connected braking block 1120, 1130 which moves with the slide block and provides means to selectively slow or halt movement (as described below). Adjustment blocks 1140, 1150 are also provided and may be set at any point along the sliding portion to limit and define the length of travel of the sliding blocks and bridge arms.

The slide portions of the slide rails assemblies may be provided with a plurality of spaced apart detents (not shown), and the adjustment block employs clamping means or other motion inhibiting means to secure the adjustment block on the slide portion of the slide rail assembly, such as a spring-biased pin, bolt, and the like, as is well known in the art. The bridge arms include a connecting pin 1160, 1170 for pivotal connection of a load-bearing member 1180, in the instant illustrations a slide board panel.

A roller assembly 1190 of the kind described above is placed between the slide rail assemblies. Then, if the adjustment block is set for full travel of the bridge arm to the end of the tailgate portion 1200 of the roller mount 1050, the load-bearing member will tilt around its connection pins as it reaches the rearward limit of its travel.

As a further enhancement, the third preferred embodiment may include a brake assembly for selectively slowing and/or halting rearward travel of the load-bearing member. This feature is of paramount importance when operations are conducted on sloped surfaces and when it is unsafe to stand in front of the moving load. The brake assembly comprises the braking block 1120 identified above, operatively connected to a manual brake 1210 through a cable 1220. The manual brake may either be a pedal for operation with the foot, or calipers for operation by hand.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A multipurpose loading and unloading apparatus for installation on a pickup truck bed or the cargo area floor of a vehicle, said apparatus comprising:
    a load-bearing member having a slide board panel with an upper load-bearing side and a lower roller-engaging side, a front portion, a rear portion, and first and second pivot points;
    a roller mount disposed under said slide board panel comprising opposing and parallel longitudinally disposed guide rails, said roller mount having a front portion and a rear portion and first and second connection points disposed on said guide rails;
    first and second tilt inducing means connected to said load-bearing member at said first and second pivot points;
    a roller assembly interposed between said roller-engaging side of said load-bearing member and the vehicle or truck bed;
    a locking lever disposed at said front portion of said load-bearing member to secure said load-bearing member until it is desired that it be rolled backwards;
    wherein said vehicle attachment means comprises seat belt straps attached to said roller mount, said straps having at least one of said buckles and clips for matable connection to an existing vehicle seat belt system in the vehicle.

2. A multipurpose loading and unloading apparatus for installation on a pickup truck bed or the cargo area floor of a vehicle, said apparatus comprising:

a load-bearing member having a slide board panel with an upper load-bearing side and a lower roller-engaging side, a front portion, a rear portion, and first and second pivot points;

a roller mount disposed under said slide board panel comprising opposing and parallel longitudinally disposed guide rails, said roller mount having a front portion and a rear portion and first and second connection points disposed on said guide rails;

first and second tilt inducing means connected to said load-bearing member at said first and second pivot points;

a roller assembly interposed between said roller-engaging side of said load-bearing member and the vehicle or truck bed;

wherein said roller assembly comprises a substantially rectangular frame having two side rails, a plurality of cylindrical transverse rails disposed between and connecting said side rails, and a plurality of rollers axially disposed on at least two of said transverse rails.

3. A multipurpose loading and unloading apparatus for installation on a pickup truck bed or the cargo area floor of a vehicle, said apparatus comprising;

a load-bearing member having a slide board panel with an upper load-bearing side and a lower roller-engaging side, a front portion, a rear portion, and first and second pivot points;

a roller mount disposed under said slide board panel comprising opposing and parallel longitudinally disposed guide rails, said roller mount having a front portion and a rear portion and first and second connection points disposed on said guide rails;

first and second tilt inducing means connected to said load-bearing member at said first and second pivot points; and a roller assembly interposed between said roller-engaging side of said load-bearing member and the vehicle or truck bed;

wherein said roller mount includes a roller platform having an upper surface upon which said roller assembly is disposed, and a lower surface for placement on the pickup truck bed or the cargo floor area of the vehicle, and side rails attached to said roller platform such that said roller assembly is interposed between said side rails and between said upper surface of said roller platform and said roller-engaging surface of said load-bearing member.

4. The apparatus of claim 3, wherein said load-bearing member further includes a front panel at said front portion, right and left side panels, an open rear end, so as to form a cargo box.

5. The apparatus of claim 3, wherein said first and second pivot points are forward of the center of gravity of said load-bearing member relative to the front and rear portions of said load-bearing member.

6. The apparatus of claim 3, further including a tether for attaching said load-bearing member to the truck bed or cargo area floor, wherein said tether is attached forward of the center of gravity of said load-bearing member such that when deployed a predetermined amount, said tether will catch the load bearing member and tilt it backwardly and downwardly to dump articles loosely resting on said upper load-bearing side.

7. The apparatus of claim 6, wherein said tethers are fabricated from material selected from the group consisting of chain, cable, and rope.

8. The apparatus of claim 3, further including connection means to secure said roller mount to the vehicle.

* * * * *